(12) United States Patent
Williams

(10) Patent No.: US 6,372,132 B1
(45) Date of Patent: *Apr. 16, 2002

(54) PURIFIER FOR FILTERING AND PURIFYING A FLUID

(76) Inventor: Richard T. Williams, P.O. Box 39, Uwchland, Chester County, PA (US) 19480

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/113,629

(22) Filed: Jul. 10, 1998

(51) Int. Cl.[7] .................. B01D 35/147; B01D 35/34
(52) U.S. Cl. .................. 210/232; 210/238; 210/250; 210/424; 210/440; 210/443; 210/450; 210/470
(58) Field of Search ................. 210/232, 233, 210/249, 250, 443, 450, 238, 424, 440, 470

(56) References Cited

U.S. PATENT DOCUMENTS

| | | | | |
|---|---|---|---|---|
| 913,827 | A | * | 3/1909 | Korten |
| 2,772,898 | A | * | 12/1956 | Seeler |
| 3,527,485 | A | * | 9/1970 | Goward et al. |
| 3,767,054 | A | * | 10/1973 | Farrow et al. ............ 210/232 |
| 3,973,791 | A | * | 8/1976 | Porta et al. |
| 4,431,218 | A | * | 2/1984 | Paul, Jr. et al. |
| 4,476,019 | A | * | 10/1984 | Nowisch et al. |
| 4,707,262 | A | * | 11/1987 | Murken |
| 4,764,275 | A | * | 8/1988 | Robichaud |
| 4,781,830 | A | * | 11/1988 | Olsen |
| 5,035,798 | A | * | 7/1991 | Stenger |
| 5,284,582 | A | * | 2/1994 | Yang |
| 5,525,219 | A | * | 6/1996 | Okabe et al. |

* cited by examiner

Primary Examiner—Matthew O. Savage
(74) Attorney, Agent, or Firm—John F. A. Earley; John F. A. Earley III; Harding, Earley, Follmer & Frailey

(57) ABSTRACT

A purifier for filtering and purifying a fluid, such as water, comprises a pressure vessel for holding a purifying element for filtering and purifying the fluid, the pressure vessel having inlet and outlet members for introducing the fluid into the pressure vessel and for removing the fluid from the pressure vessel. A first end cap closes a first opening in the housing of the pressure vessel, and a sealing member located between the first end cap and the housing of the pressure vessel seals between the first end cap and the housing. A first removable retaining yoke extends between the housing and the first end cap for securing the first end cap to the housing. Level compensating support members are provided for supporting the pressure vessel above a surface on which the purifier rests in a secure, non-wobbling manner. Optionally, a by-pass channel and a by-pass valve are provided to cause the fluid to by-pass the purifying element, when filtered/purified fluid is not desired.

18 Claims, 11 Drawing Sheets

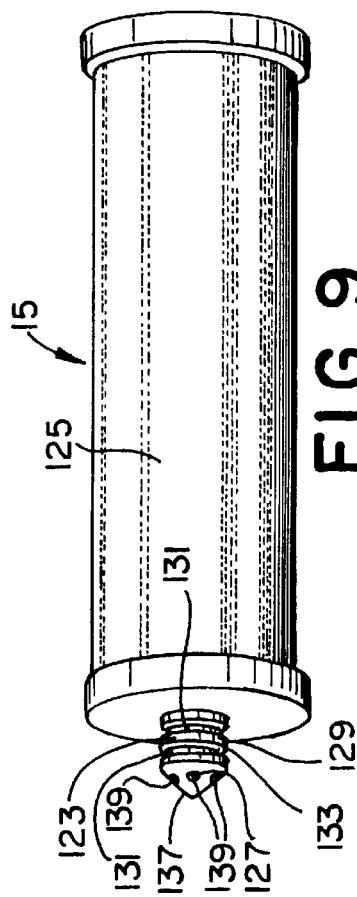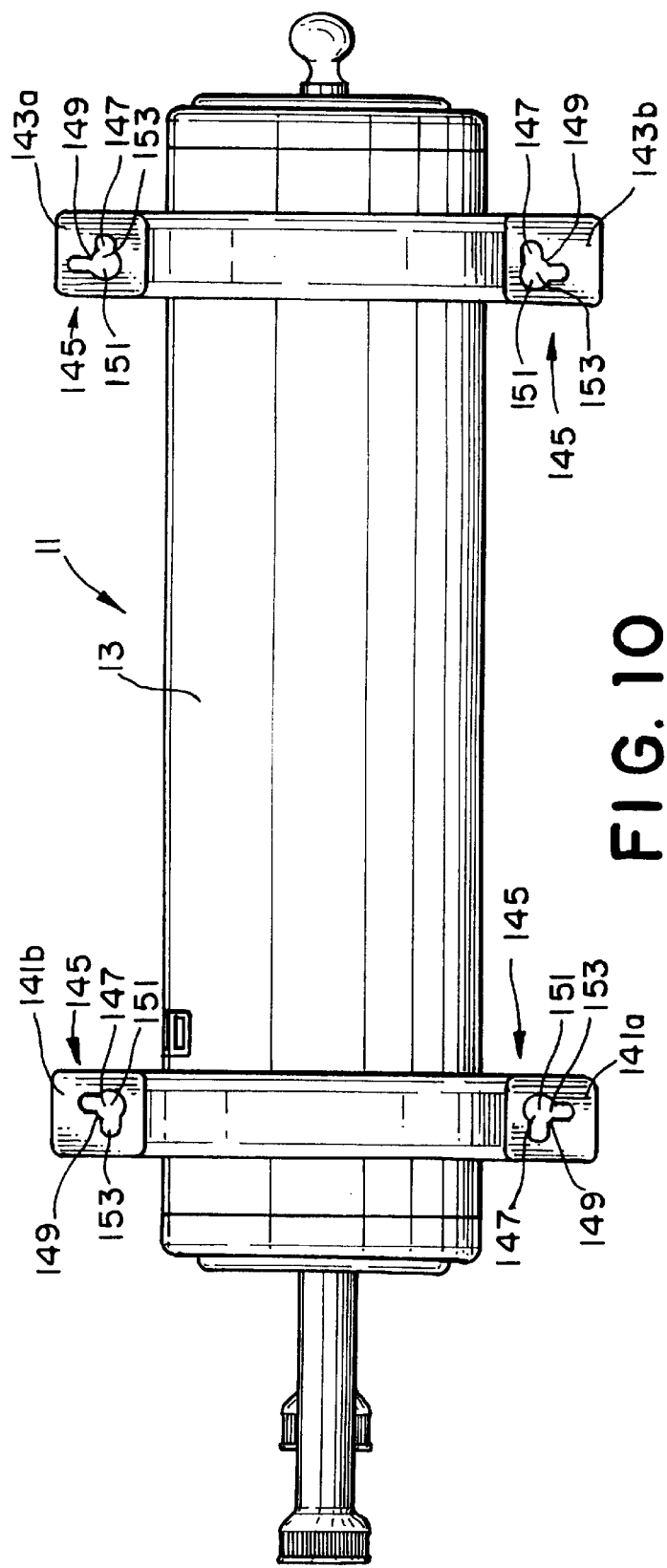

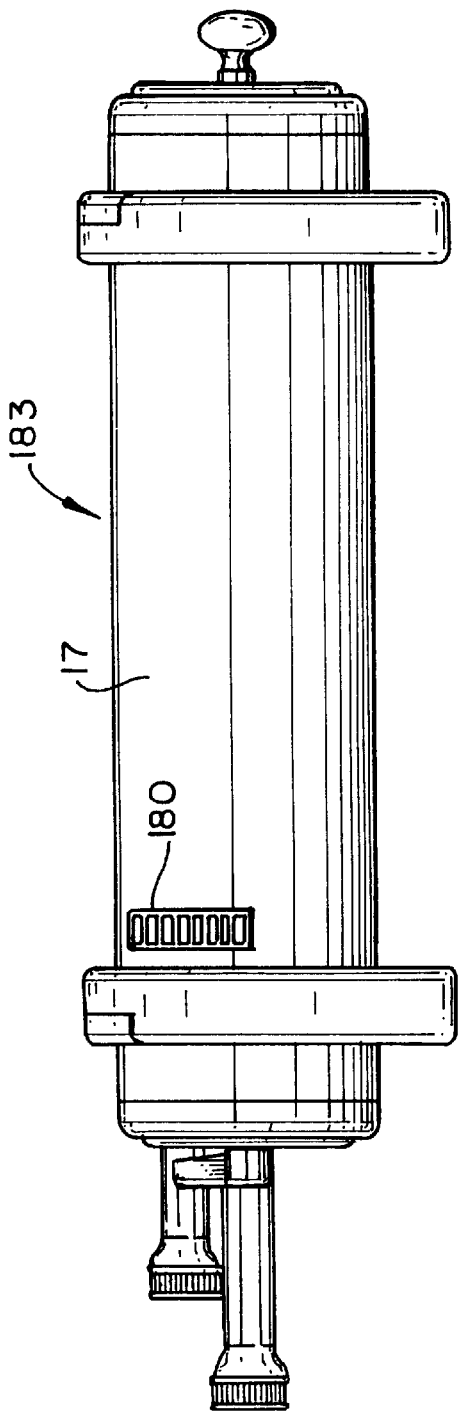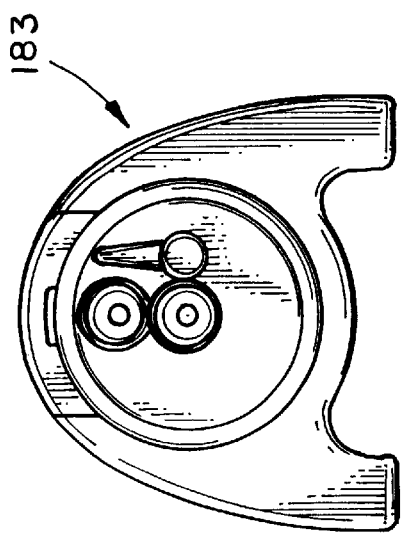

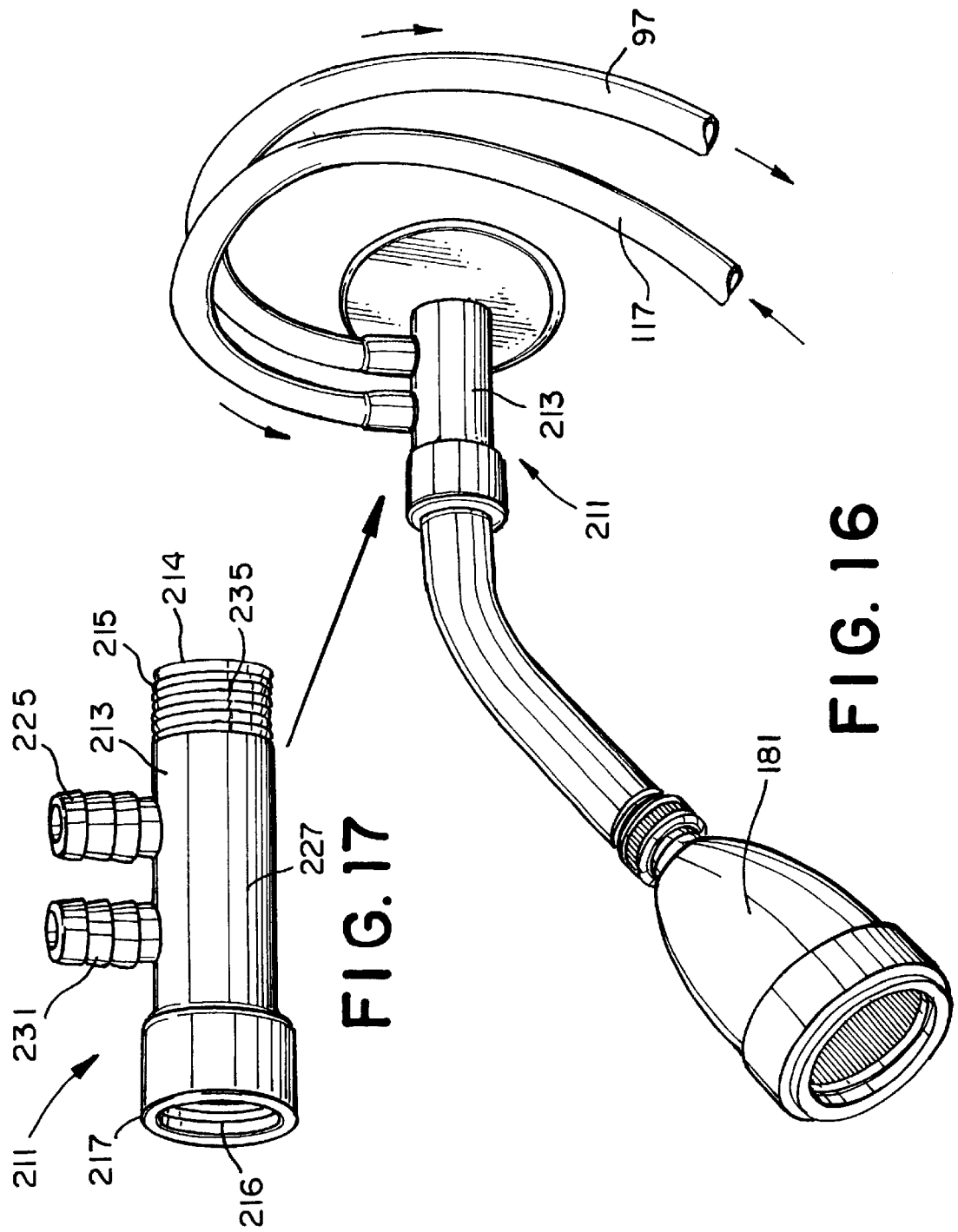

PURIFIER FOR FILTERING AND PURIFYING A FLUID

BACKGROUND OF THE INVENTION

1. Field of the Invention

This invention relates to filtration and purification of fluids, and more particularly, concerns a purifier for filtering and purifying fluids such as water used for bathing or showering to remove unwanted chemicals and contaminants (e.g., chlorine, THMs, and many other chemicals) typically found in bath/shower water. Such unwanted chemicals and contaminants may have unpleasant odors, may cause skin and hair irritation and even may be a health hazard to a person taking a bath or a shower.

2. Description of the Prior Art

Typically, conventional filtering devices comprise a pressure vessel having a bowl, filtering/purifying material housed in the bowl, a cover for closing the bowl, and a clamp, such as a V-clamp, to hold the cover to the bowl. In place of the clamp, it is known to use brackets, or nuts and bolts, or threading to secure the cover to the bowl.

In addition to being somewhat time consuming, closing such filtering devices using clamps, or brackets, or nuts and bolts, or threading is a fairly cumbersome and uncertain task. Further, when threading is used, there is a risk of the threading seizing-up or being stripped.

When not mounted on a surface such as a wall or a floor, some conventional filtering devices have a tendency to tip over and to wobble if placed on a non-level surface.

Conventional filtering devices have been used in an effort to filter bath/shower water, which typically contains unwanted chemicals and contaminants (e.g., chlorine, THMs, and many other chemicals). Such contaminants are a problem to bathers with skin problems such as psoriasis, eczema, and dry skin. Even bathers that do not suffer from such skin problems may be adversely affected by absorption through their skin of unwanted chemicals and contaminants contained in typical bath/shower water. This is especially so for those bathers who soak in a hot water-filled tub for an extended period, such as an hour or two, to relax, as is customary in Japanese culture. Further, people have noted harsh effects on their hair, and people with blonde hair are faced with the possible problem of their hair turning green when washing their hair in water containing chlorine.

There are existing shower filters which use activated charcoal or brass filings in an effort to filter and reduce these problems in bath/shower water. However, these existing shower filters are not very effective and have relatively low capacity in reducing unwanted chemicals and contaminants found in bath/shower water.

A common type of shower filter comprises a small filtering device which is inserted in series between the pipe feeding the shower head and the shower head. Due to being located on the end of the pipe feeding the shower head between the pipe feeding the shower head and the shower head, the size, capacity, and effectiveness of the shower filter is further limited.

SUMMARY OF THE INVENTION

It is an object of the invention is to provide a purifier that is easy to open and close to facilitate replacing the purifying element contained therein when necessary.

It is another object to provide a purifier that rests in a secure, stable, non-wobbling manner on level surfaces and even on non-level surfaces.

It is another object to provide a purifier that may be easily mounted on a surface, when desired.

Another object of the invention to provide a purifier for removing unwanted chemicals and contaminants (e.g., chlorine, THMs and many other chemicals) found in bath/shower water.

These and other objects are accomplished by providing the inventive purifier as described below.

The inventive purifier for filtering and purifying a fluid comprises a pressure vessel for holding a purifying element for filtering and purifying the fluid. The pressure vessel has inlet and outlet means for introducing the fluid into the pressure vessel and for removing the fluid from the pressure vessel. The pressure vessel includes a housing having a first opening and a second opening formed therein.

A first end cap closes the first opening in the housing of the pressure vessel, and sealing means located between the first end cap and the housing of the pressure vessel seal between the first end cap and the housing.

Securing means secure the first end cap to the housing when desired, and the securing means include a first yoke extending between the housing and the first end cap. The first end cap is substantially cylindrical in shape and preferably has a groove extending around its circumference in its side portion for receiving the first yoke. Preferably, the housing is provided with a first pair of slots and a second pair of slots that are aligned with the groove in the first end cap. Also, preferably, the first yoke has a substantially inverted U-shape and comprises a first pin having an end portion, a second pin having an end portion, and a bridge having a first end portion and a second end portion, the first pin being mounted on the first end portion of the bridge and extending therefrom, and the second pin being mounted on the second end portion of the bridge and extending therefrom parallel to the first pin. The first yoke secures the end cap to the housing by the first pin of the first yoke extending through the first pair of slots in the housing and tangentially across the side portion of the end cap in a portion of the groove of the first end cap and the second pin of the first yoke extending through the second pair of slots in the housing and tangentially across the side portion of the end cap in a portion of the groove in the first end cap.

A second end cap closes the second opening in the housing, and sealing means located between the second end cap and the housing of the pressure vessel seal between the second end cap and the housing.

Securing means secure the second end cap to the housing when desired, and the securing means include a second yoke extending between the housing and the second end cap. The second end cap is substantially cylindrical in shape and preferably has a groove extending around its circumference in its side portion for receiving the second yoke. Preferably, the housing is provided with a third pair of holes and a fourth pair of holes that are aligned with the groove in the second end cap. Also, preferably, the second yoke has a substantially inverted U-shape and comprises a first pin having an end portion, a second pin having an end portion, and a bridge having a first end portion and a second end portion, the first pin being mounted on the first end portion of the bridge and extending therefrom, and the second pin being mounted on the second end portion of the bridge and extending therefrom parallel to the first pin. The second yoke secures the second end cap to the housing by the first pin of the second yoke extending through the third pair of holes in the housing and tangentially across the side portion of the second end cap in a portion of the groove in the second end cap and the second pin of the second yoke extending through the fourth pair of holes in the housing and tangentially across the side portion of the second end cap.

Level compensating support means support the pressure vessel above a surface on which the purifier rests in a secure, non-wobbling manner. The level compensating support means includes a first ring that surrounds a portion of the outer surface portion of the pressure vessel and is in sliding contact with the outer surface portion of the pressure vessel. A first pair of feet extend from the first ring for supporting the pressure vessel above the surface on which the purifier rests. A second ring surrounds a portion of the outer surface portion of the pressure vessel, and a second pair of feet extends from the second ring for supporting the pressure vessel above the surface on which the purifier rests. The first ring may be rotated around the outer surface portion of the pressure vessel as needed to position the feet of the first ring such that all of the feet are in contact with the surface on which the purifier rests.

The first ring has a cut-out portion shaped to snugly receive the bridge of the first yoke, and the first ring has two recesses on its inside surface to receive the end portions of the first and second pins of the first yoke when the first yoke is securing the first end cap to the housing.

The second ring has a cut-out portion shape to snugly receive the bridge of the second yoke, and the second ring has two recesses on its inside surface to receive the end portions of the first and second pins of the second yoke when the second yoke is securing the second end cap to the housing.

Optionally, the second ring also is in sliding contact with the outer surface of the pressure vessel, and the holes of the third pair of holes and the fourth pair of holes are in the form of slots so that the first and second rings may be rotated around the outer surface portion of the pressure vessel as needed to position the feet such that all of the feet are in contact with the surface on which the purifier rests.

Optionally, the purifier includes by-pass means formed in the first end cap for causing the fluid to by-pass the purifying element as the fluid passes through the pressure vessel, when filtered/purified fluid is not desired. The by-pass means comprises a by-pass channel formed in the first end cap and extending from the interior of the pressure vessel to the outlet means of the pressure vessel downstream from the purifying element, and valve means for opening and closing the by-pass channel as desired.

Preferably, the inlet and outlet means are formed in the first end cap.

Optionally, the purifier includes mounting means located in the feet for mounting the purifier to a surface.

An inventive adapter is provided for adapting fluid fixture lines to feed fluid to be filtered/purified to a purifier and to feed filtered/purified fluid from the purifier to an outlet port in the fluid fixture lines, which includes a substantially hollow pipe having an inlet port at its first end portion and an outlet port at its second end portion. A partition wall is formed inside the pipe that prevents the flow of fluid directly through the pipe, and the partition wall divides the pipe into a first chamber formed in the first end portion of the pipe and a second chamber formed in the second end portion of the pipe.

A first barb, adapted to receive a hose, is connected to the first end portion of the pipe, and has an outlet passageway extending through it and communicating with the first chamber for feeding fluid to be filtered/purified to the purifier.

A second barb, adapted to receive a hose, is connected to the second end portion of the pipe, and has an inlet passageway extending through it and communicating with the second chamber for feeding filtered/purified fluid from the purifier to the second chamber.

First attachment means is provided on the first end portion of the pipe at the inlet port of the pipe for attaching the pipe to the fluid fixture line feeding the fluid to be filtered/purified to the first chamber of the pipe, and second attachment means is provided on the second end portion of the pipe at the outlet port of the pipe for attaching the pipe to the fluid fixture line leading to the outlet port of the fluid fixture line.

BRIEF DESCRIPTION OF THE DRAWINGS

FIG. 9 is a view in perspective of a purifying element in the form of a cartridge;

FIG. 10 is a view in bottom plan of the purifier constructed in accordance with the invention, showing mounting means formed in the feet of the purifier;

FIG. 11 is a view in side elevation of an alternative embodiment of the invention;

FIG. 12 is a view in front elevation of the purifier shown in FIG. 11;

FIG. 16 shows a partial view in perspective of the shower adapter shown in FIG. 15 mounted on the bath tub fixtures;

FIG. 17 is a view in perspective of the shower adapter shown in FIGS. 15 and 16.

DETAILED DESCRIPTION OF THE DRAWINGS

Turning now to the drawings, and in particular to FIGS. 1 to 10, there is shown a purifier 11, constructed in accordance with the invention, for filtering and purifying a fluid, such as water. A principal use for the purifier 11 is to remove unwanted chemicals and contaminants (e.g., chlorine, chloroform, and other is chemicals and THMs) found in bath/shower water which may be problematic and even a health hazard to a person taking a bath or a shower.

Figure 5:
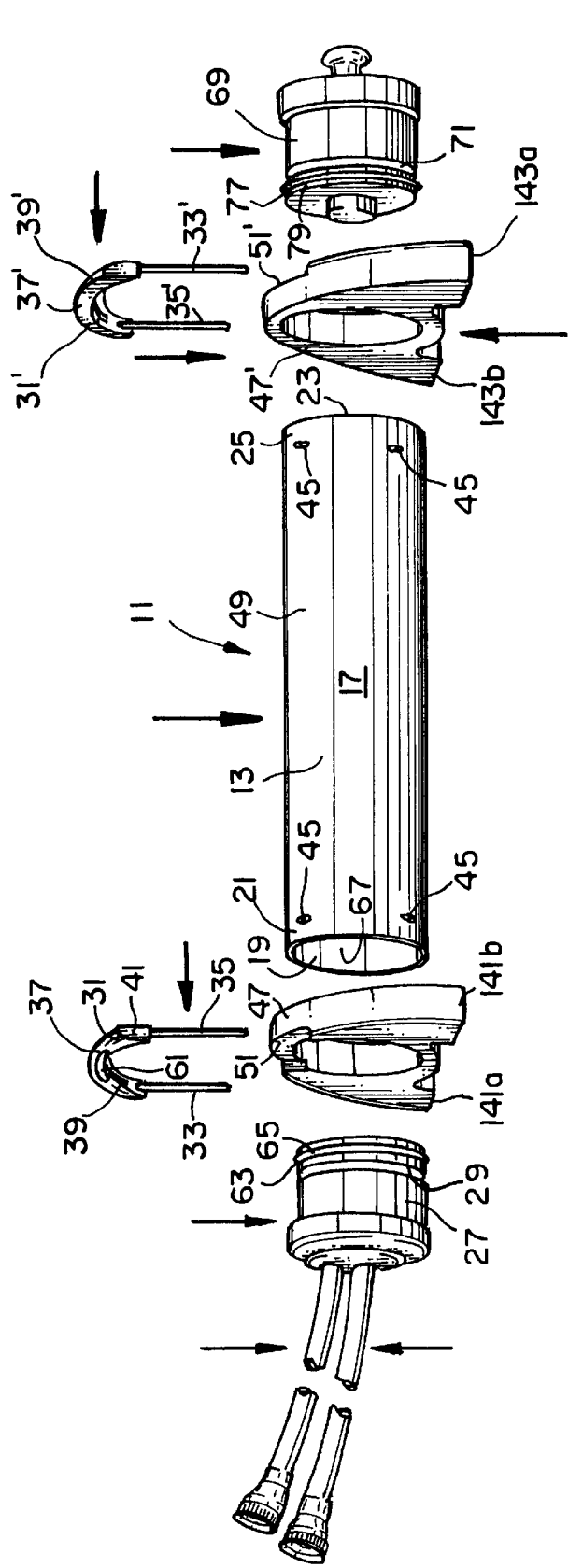
FIG. 5 is an exploded view of the purifier shown in FIGS. 1–4.
Figure 6:
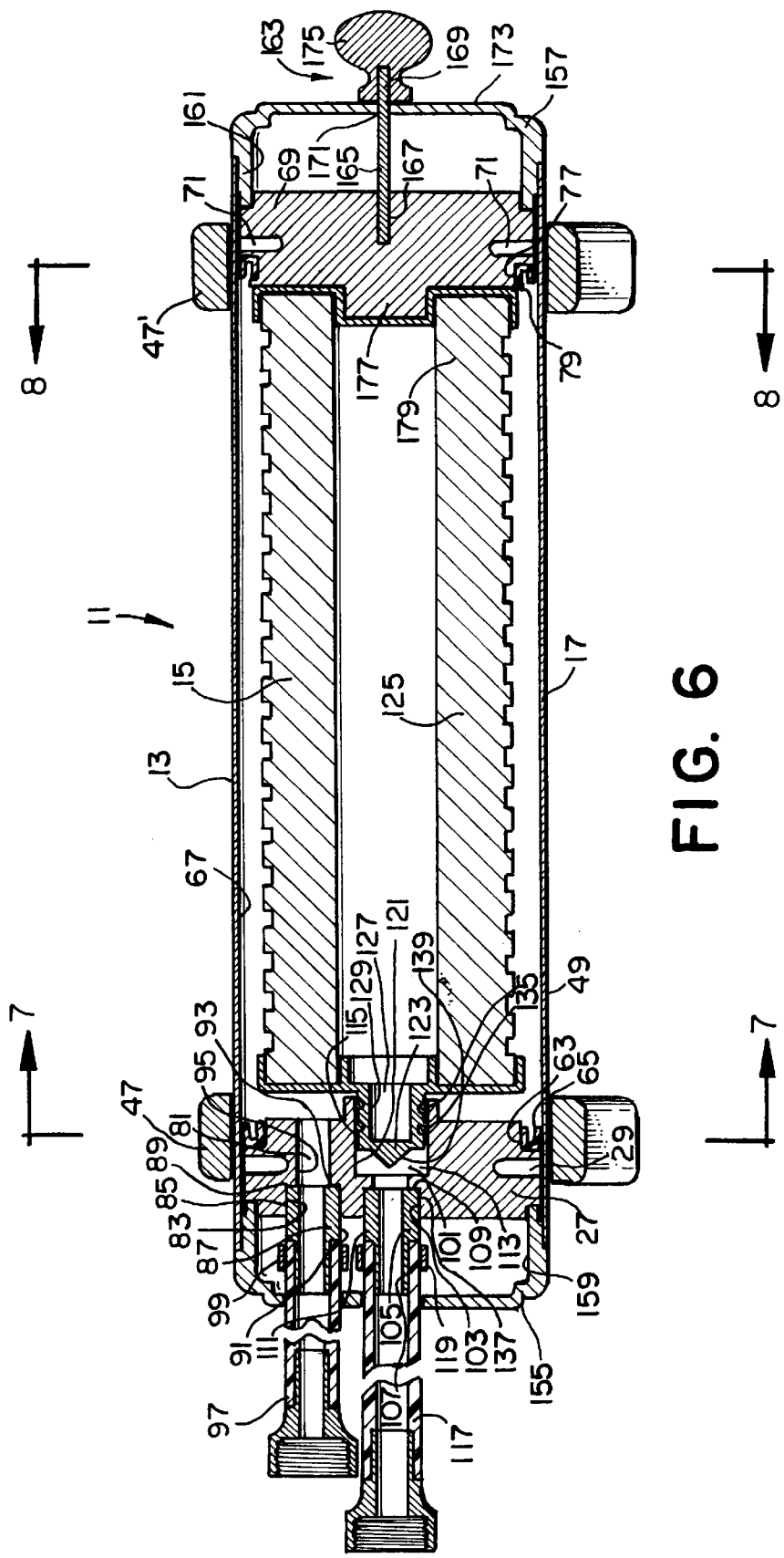
FIG. 6 is a view in cross section of the purifier shown in FIGS. 1–5.

Referring to FIGS. 5 and 6, the purifier 11 includes a pressure vessel 13 for holding a purifying element, which preferably is in the form of a cartridge 15, for filtering and purifying the fluid. The pressure vessel 13 has a hollow cylindrical tube forming its housing 17 and has a first opening 19 at the first end portion 21 of the housing 17 and a second opening 23 formed in the second end portion 25 of the housing 17.

A first end cap 27 is provided for closing the first opening 19 of housing 17. The first end cap 27 is substantially cylindrical in shape and has a groove 29 extending around its circumference in its side portion.

Figure 4:
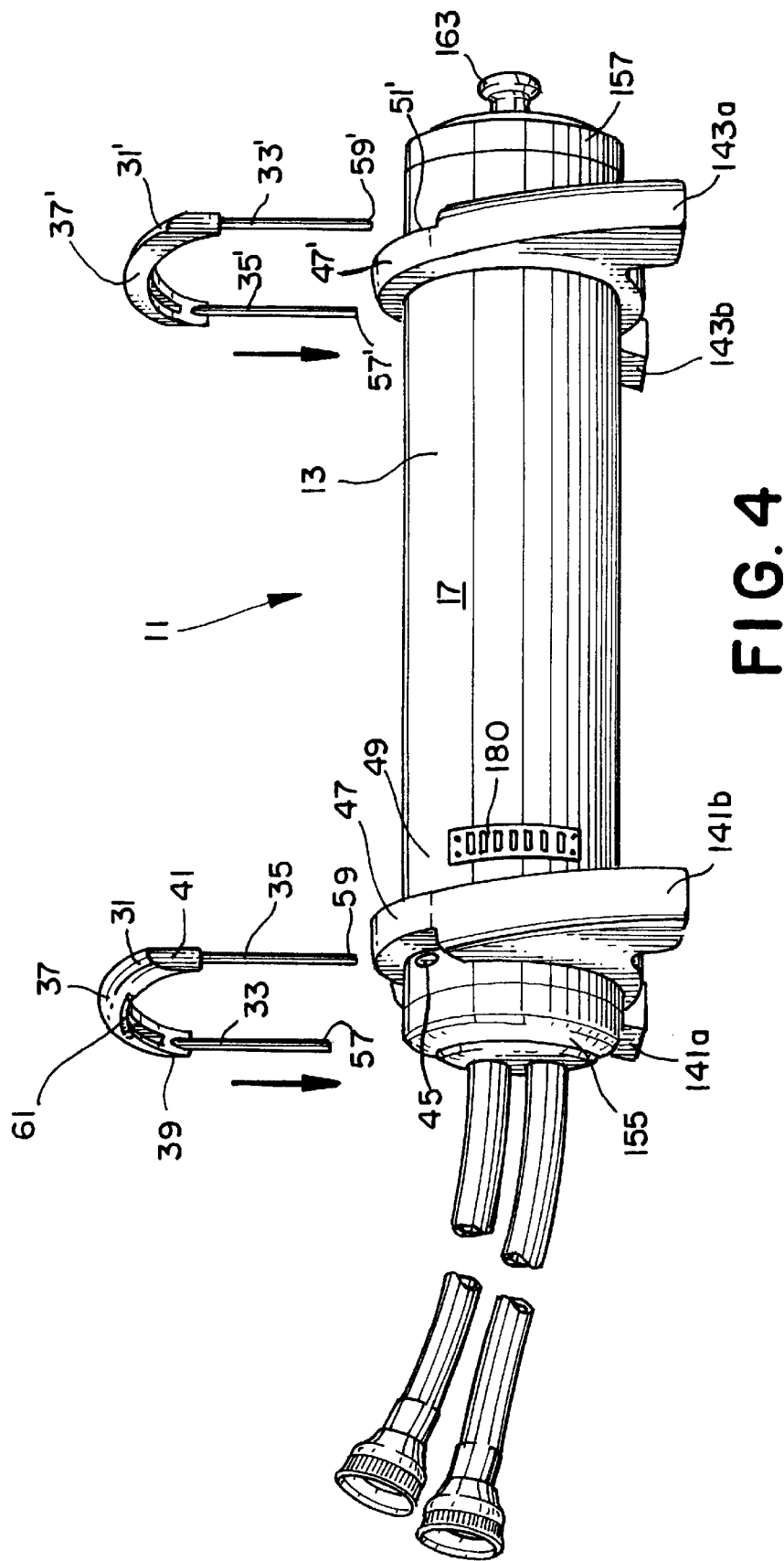
FIG. 4 is a view in perspective of the purifier shown in FIG. 3, illustrating where the yokes used to secure the end caps of the purifier in place are inserted into the pressure vessel housing.
Figure 7:
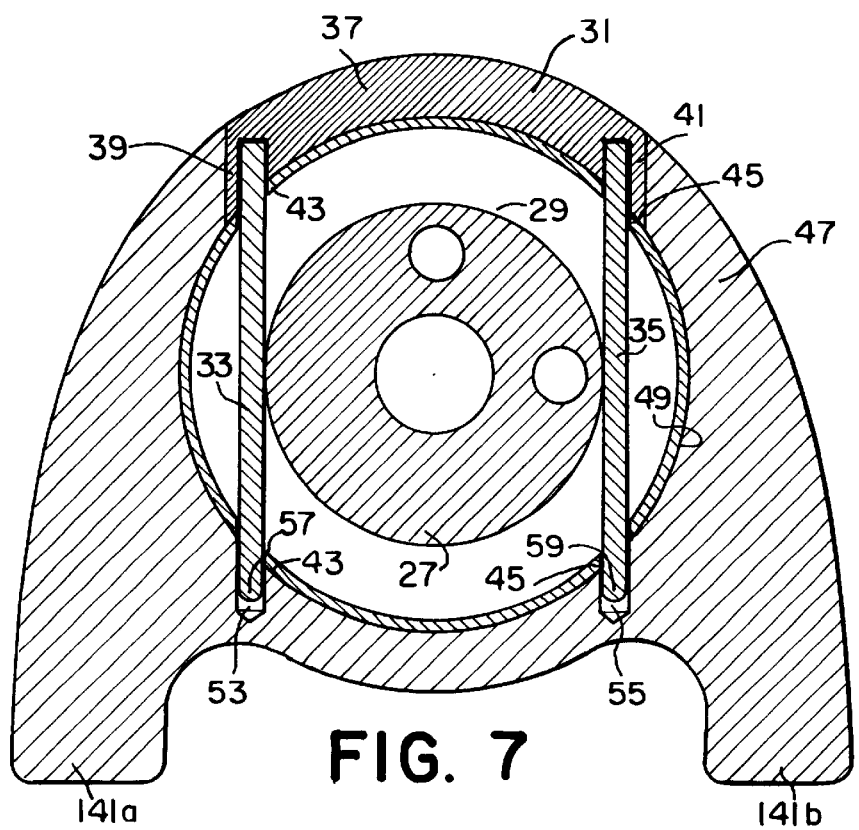
FIG. 7 is a view in cross section taken along the lines and arrows 7—7 shown in FIG. 6.

As shown in FIGS. 4, 5, and 7, a removable retaining yoke 31 is provided for securing the first end cap 27 to the housing 17 when desired. The yoke 31 has a substantially inverted U-shape, and includes a first pin 33, a second pin 35, and a bridge 37. The first pin 33 is mounted on a first end portion 39 of the bridge 37 and extends therefrom, and the second pin 35 is mounted on a second portion 41 of the bridge 37 and extends therefrom parallel to the first pin 33.

The housing 17 has two pairs of holes 43 and 45 formed in the first end portion 21 of the housing 17 that are aligned with the groove 29 in the first end cap 27 when the first end cap 27 is positioned to close the first opening 19 in the first end portion 21 of the housing 17. By extending the first pin 33 of yoke 31 through holes 43 and tangentially across the side portion of the first end cap 27 in a portion of the groove 29 and extending the second pin 35 of yoke 31 through holes 45 and tangentially across the side portion of the first end cap 27 in a portion of the groove 29, the first end cap 27 is secured to the housing 17 closing the first opening 19.

A first ring 47 surrounds a portion of the outer surface portion 49 of the pressure vessel 13 and aids in securing the first end cap 27 to the housing 17.

First ring 47 has a cut-out portion 51, and bridge 37 of the yoke 31 is shaped to fit snugly in the cut-out portion 51. First ring 47 also has two indents 53 and 55, with the indent 53 positioned to receive the end portion 57 of first pin 33 of yoke 31 and the indent 55 positioned to receive the end portion 59 of the second pin 35 of yoke 31. Accordingly, when yoke 31 is securing the first end cap 27 in position covering the opening 19 in the pressure vessel 13, the bridge 37 of yoke 31 is flush with the first ring 47, fitting snugly in the cut-out portion 51, pin 33 extends through holes 43, the end portion 57 of pin 33 sits in the indent 53, pin 35 extends through holes 45, and the end portion 59 of pin 35 sits in the indent 55.

To facilitate removal of yoke 31 from the first ring 47 and housing 17 to enable removal of the first end cap 27 from the opening 19 in the pressure vessel 13, a recess 61 is formed in the bridge 37 that is adapted to receive any type of prying tool (e.g., edge of a coin, screwdriver, butter knife, fingernail) for prying the bridge 37 out of the cut-out portion 51. After prying the bridge 37 from the cut-out portion 51, the yoke 31 may be easily pulled off and removed from the ring 47 and the pressure vessel housing 17.

A second groove 63 is formed in and extends around the outer side surface of the first end cap 27, and a gasket 65, such as a Chevron gasket or an O-ring gasket, rests in the second groove 63 for sealing between the first end cap 27 and the inner surface portion 67 of the housing 17.

A second end cap 69 is provided for closing the second opening 23 of housing 17. The second end cap 69 is substantially cylindrical in shape and has a groove 71 extending around the circumference in its side portion.

Figure 8:
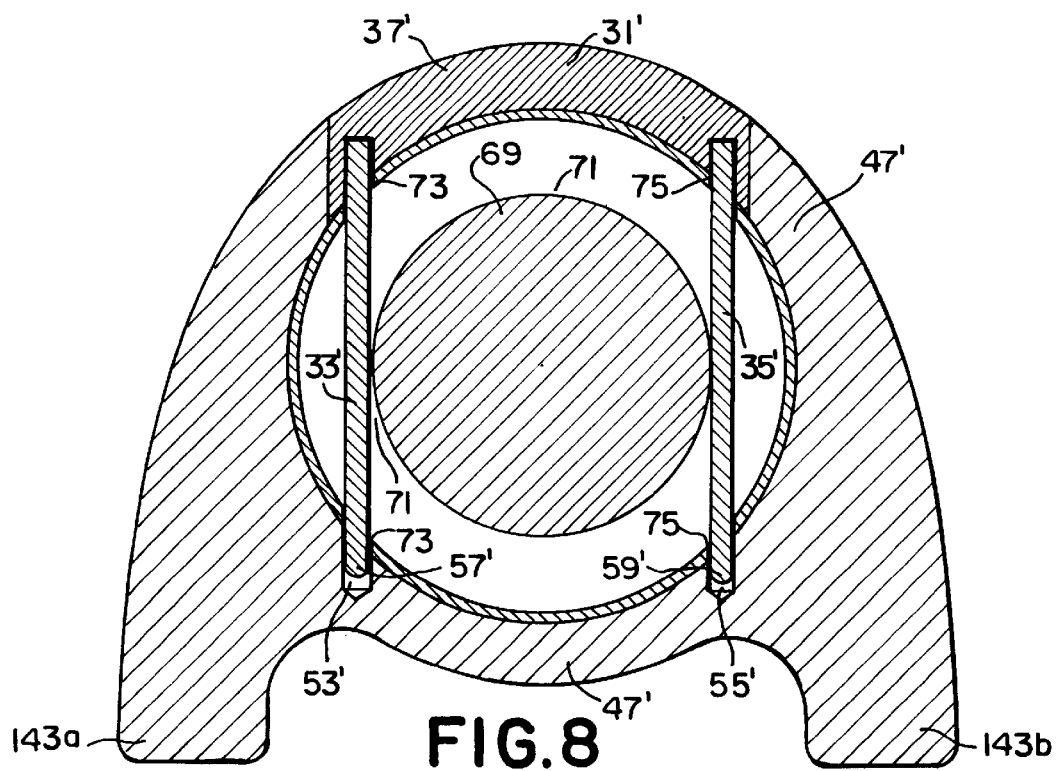
FIG. 8 is a view in cross section taken along the lines and arrows 8—8 shown in FIG. 6.

As shown in FIGS. 4, 5, and 8, a removable retaining yoke 31' is provided for securing the second end cap 69 to the housing 17, when desired. The yoke 31' is identical to the yoke 31, and includes a first pin 33', a second pin 35', and a bridge 37'.

The housing 17 has two pairs of holes 73 and 75 formed in the second end portion 25 of the housing 17 that are aligned with the groove 71 in the second end cap 69 when the second end cap 69 is positioned to close the second opening 23 in the second end portion 25 of the housing 17. By extending the first pin 33' of yoke 31' through holes 73 and tangentially across the side portion of the second end cap 69 in a portion of the groove 71 and extending the second pin 35' of yoke 31' through holes 75 and tangentially across the side portion of the second end cap 69 in a portion of the groove 71, the second end cap 69 is secured to the housing 17 closing the second opening 23.

A second ring 47' surrounds a portion of the outer surface portion 49 of the pressure vessel 13 and aids in securing the second end cap 69 to the housing 17. The second ring 47', which is identical to first ring 47, has a cut-out portion 51', and the bridge 37' of the yoke 31' is shaped to fit snugly in the cut-out portion 51'. The second ring 47' also has two indents 53' and 55', with the indent 53' positioned to receive the end portion 57' of the first pin 33' of the yoke 31' and the indent 55' positioned to receive the end portion 59' of the second pin 35'" of the yoke 31'. Accordingly, when yoke 31' is securing the second end cap 69 in position covering the opening 23 in the pressure vessel 13, the bridge 37' of yoke 31' is flush with the second ring 47', fitting snugly in the cut-out portion 51', pin 33' extends through holes 73, the end portion 57' of the pin 33' sits in the indent 53', the pin 35' extends through holes 75, and the end portion 59' of pin 35' sits in the indent 55'.

A second groove 77 is formed in and extends around the outer side surface of the second end cap 69, and a gasket 79, such as a Chevron gasket or an O-ring gasket, rests in the second groove 77 for sealing between the second end cap 69 and the inner surface portion 67 of the housing 17.

Alternatively, the yokes 31 and 31' may be replaced with yokes that comprise a pin or rod extending through two aligned openings in the tube-portion of the pressure vessel 13 and through a bore or an open space formed in and extending through the end caps which is aligned with the openings in the tube-portion of the pressure vessel. Also, alternatively, a yoke, like yokes 31 and 31', having two pins connect together but with a shorter bridge, may be used which extends through two aligned openings the tube-portion of the pressure vessel and through a bore or an open space formed in and extending through the end caps which is aligned with the openings in the tube-portion of the pressure vessel.

Referring to FIG. 6, an inlet channel 81 is formed in the first end cap 27 for passing the fluid to be treated into the pressure vessel 13. A cylindrical socket 83 is formed in the inlet channel 81, which fixedly receives the end portion 85 of a barb 87.

An annular recess 89 is formed in the outer surface 91 of the barb 87 at the end of the end portion 85 of the barb 87, and an O-ring gasket 93 is received in the recess 89 for sealing between the barb 87 and the wall 95 of the inlet channel 81 at the socket 83.

An inlet hose 97 is mounted onto the barb 87 using a clamp 99.

An outlet channel 101 also is formed in the first end cap 27 for passing filtered and purified fluid from the pressure vessel 13.

A first cylindrical socket 103 is formed in the outlet channel 101, which fixedly receives the end portion 105 of a barb 107. An annular recess 109 is formed in the outer surface portion 111 of the barb 107 at the end portion 105 of the barb 107, and an O-ring gasket 113 is received in the recess 109 for sealing between the barb 107 and the wall 115 of the outlet channel 101 at the first socket 103.

An outlet hose 117 is mounted into the barb 107 using a clamp 119.

In the preferred embodiment of the invention shown in the drawings, hoses 97 and 117 are virtually twist-free with respect to each other because the first end cap 27 is free to rotate or spin in the opening 19 of the housing 17.

A second cylindrical socket 121 is formed in the outlet channel 101, which receives the outlet port portion 123 of the cartridge 15.

Referring to FIGS. 6 and 9, the cartridge 15 filters and purifies the water passing through the pressure vessel 13. A preferred cartridge may be obtained from General Ecology, Inc. of Exton, Pa. Fluid, such as water, passes into the cartridge 15 through the purification material 125, and filtered and purified fluid exits the cartridge 15 through an outlet port 127 formed in the outlet port portion 123 of the cartridge 15.

The outlet port portion 123 of the cartridge 15 comprises a hollow stem 129 having annular grooves 131 formed in its outer periphery 133 which receive O-ring gaskets 135 for sealing between the stem 129 and the wall 115 of the outlet channel 101 at the second socket 121. A conical cap 137 having holes 139 formed therein is formed on the end portion of the stem 129.

Filtered/purified fluid, such as filtered/purified water, leaving cartridge 15 passes through the holes 139 in the conical cap 137 and into the outlet channel 101.

The cartridge 15 is self-aligning during installation. When the cartridge 15 is slid into the pressure vessel 13 during installation of the cartridge 15, a portion of the conical cap 137 hits against the entrance of the second socket 121 in the outlet channel 101 and acts as a ramp to properly align the stem 129 of the cartridge 15 for insertion into the second socket 121 of the outlet channel 101.

Referring to FIGS. 5–8, the first ring 47 and the second ring 47' have support means for supporting the pressure vessel 13 above surface on which the purifier 11 rests. The support means comprises a pair of feet 141a, 141b formed on the first ring 47 and a pair of feet 143a, 143b formed on the second ring 47'. Preferably, the support means is level compensating such that the purifier 11 rests on the surface supporting it in a secure, stable, non-wobbling manner, even if that surface is not completely uniform or level such as a tile floor of a bathroom.

Level compensating support means are obtained by forming holes 43 and 45 as elongated slots, or by forming holes 73 and 75 as elongated slots, or by forming holes 43 and 45 and holes 73 and 75 all as elongated slots. In the preferred embodiment of the invention shown in the drawings, only holes 43 and 45 are formed as elongated slots. Because holes 43 and 45 are elongated slots, the first ring 47, which is in tight but slidable contact with the outer surface 49 of the pressure vessel housing 17, may be turned around (partially rotated around) the pressure vessel housing 17 to the extent needed to permit the feet 141a, 141b to be positioned such that all of feet 141a, 141b, 143a, and 143b are in contact with the surface on which the purifier 11 rests.

As shown in FIG. 10, mounting means 145 is provided for mounting the pressure vessel 13 to the surface on which it rests. Mounting means 145 comprises a cavity 147 formed in each of feet 141a, 141b, 143a, and 143b, the entrance to each cavity 147 being partially obstructed by a tab 149 such that the head of a nail or screw attached to the surface on which the water purifier is being mounted may fit through the widest portion 151 of the entrance 153 to the cavity 147 during mounting, but is blocked from exiting the cavity 147 by the tab 149 after the purifier 11 is moved laterally so that the heads of the nails or screws are no longer aligned with the widest portion 151 of the cavity entrances 153. Alternatively, mounting means 145 may comprise Velcro fasteners, with one portion of the Velcro fasteners being mounted on the bottom of each of feet 141a, 141b, 143a, and 143b, and the other portion of the Velcro fasteners being mounted on the bathroom floor, the bathtub, the bathroom wall, or the like.

As shown in FIG. 6, beauty caps 155 and 157, which are substantially cup-shaped, are mounted on each end of the purifier 11, with the rim portion 159 of the beauty cap 155 engaging the first end cap 27 and the housing 17, and with the rim portion 161 of the beauty cap 157 engaging the second end cap 69 and the housing 17.

A handle 163 is provided for pulling the second end cap 69 from the opening 23 in the housing 17 when it is desired to replace the cartridge 15. Handle 163 comprises a rod 165 having a first end portion 167 that is fixed in the second end cap 69. Rod 165 has a second end portion 169 that extends through an opening 171 in the end wall 173 of the beauty cap 157 and that has a gripping member 175 mounted to it beyond the end wall 173 of the beauty cap 157.

Referring to FIGS. 5 and 6, the second end cap 69 has an anti-sway stub 177, which is adapted to receive the end portion 179 of the cartridge 15 fitted over it to prevent the cartridge 15 from swaying back and forth inside the pressure vessel 13 during use of the purifier 11.

Figure 1:
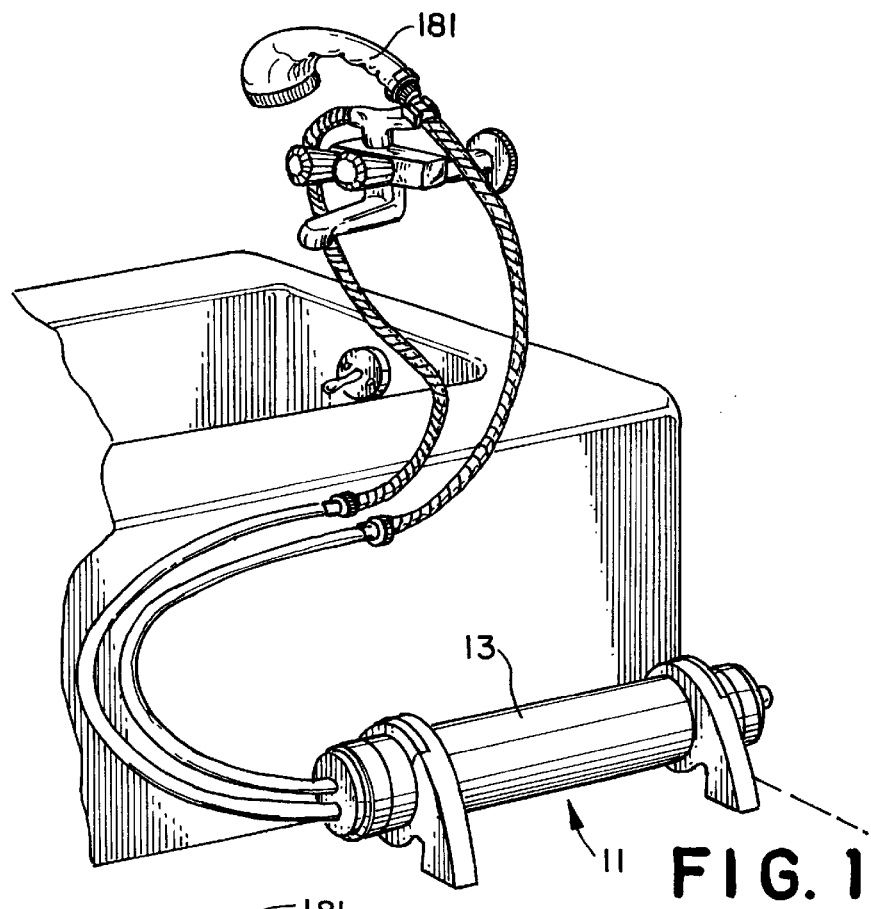
FIG. 1 is a view in perspective of a purifier constructed in accordance with the invention, with the purifier shown resting in a secure, stable, and non-wobbling manner on the floor of a bathroom and with the purifier shown connected to the fixtures of a bath tub.
Figure 2:
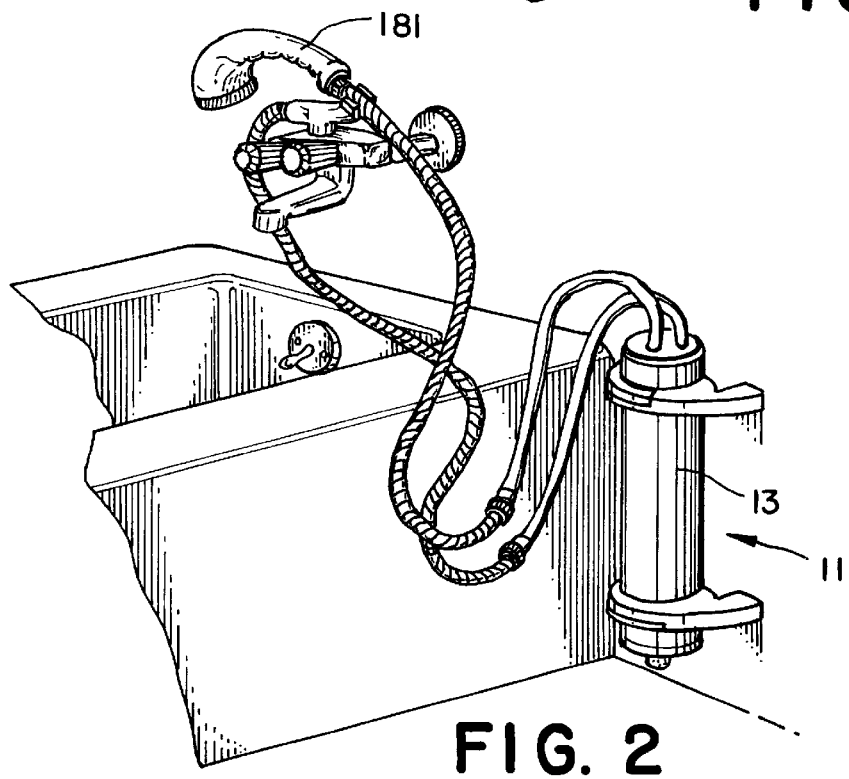
FIG. 2 is a view in perspective of a purifier constructed in accordance with the invention, with the water purifier shown mounted on a bathroom wall and connected to the fixtures of a bath tub.
Figure 3:
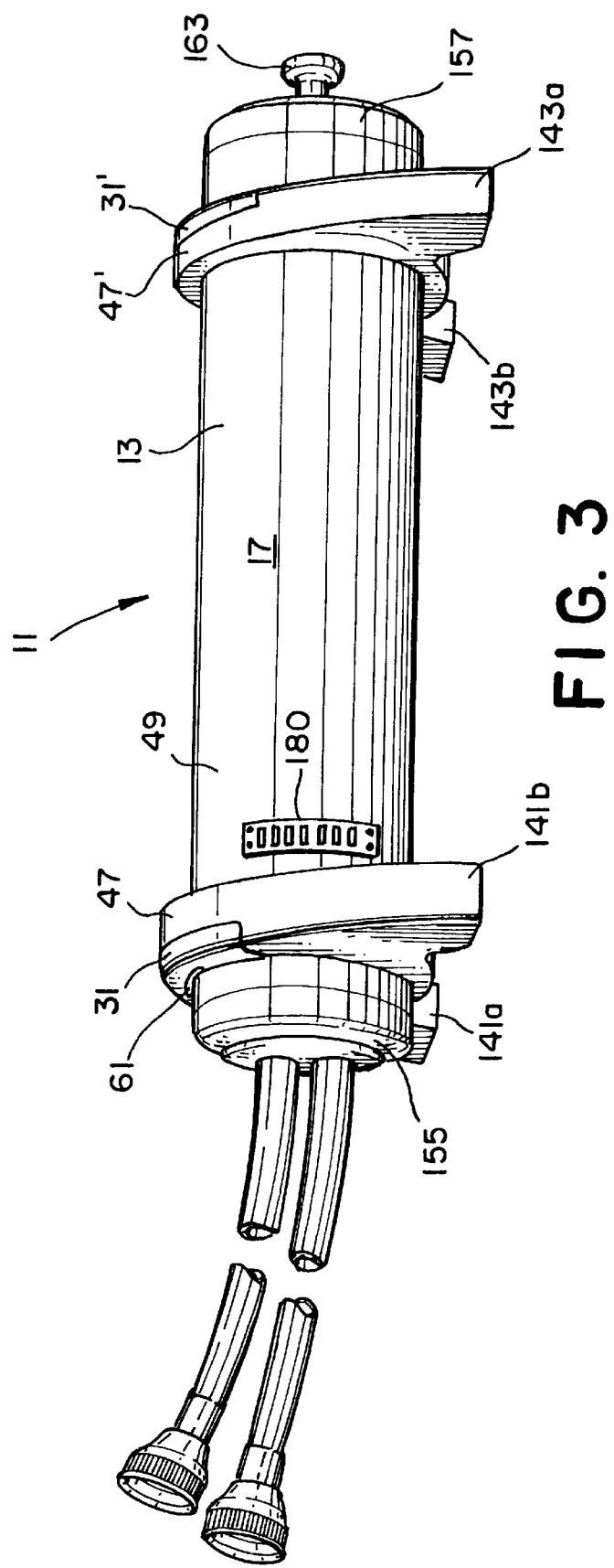
FIG. 3 is a view in perspective of the purifier shown in FIGS. 1 and 2.

Optionally, a temperature indicator, such as a indicating strip 180, may be provided for measuring and indicating the temperature of the fluid flowing through the purifier 11. Temperature indicating strip 180 is adhered to the outer surface portion 49 of the pressure vessel 13, as shown in FIGS. 3, 4, and 11.

Preferably, the pressure vessel 13, the pins 33, 35, 33', and 35', the barbs 87 and 107, the handle 163, and the pin 201 are made of metal, but each may also be made of plastic. The remaining components of the pressure vessel 13 preferably are made of plastic, but each may also be made of metal.

The hoses 97 and 117 preferably are made of rubber or plastic, and have metal fittings. The gaskets used in the purifier of the invention preferably are made of rubber, but other resilient materials also may be used.

In use, the hose 97 is connected to a fluid feeding line, such as a water line of a bathtub or shower, and the hose 117 is connected to an outlet port, such as a fixed or movable shower head 181, for example. A cartridge 15 is inserted into the pressure vessel 13 through opening 23 after the second end cap 69 is removed from opening 23 in the pressure vessel 13 by prying bridge 37' of the yoke 31' from cut-out portion 51' of the second ring 47', removing the yoke 31' from the pressure vessel 13, and pulling on the gripping member 175 of handle 163 to remove the second end cap 69 from the opening 23.

Then, the cartridge 15 is inserted into the pressure vessel 13, the outlet stem 129 of the cartridge 15 engaging the socket 121 formed in the outlet channel 101 in the first end cap 27, as shown in FIG. 6. The second end cap 69 is re-secured to the pressure vessel housing 17 by inserting the second end cap 69 into the opening 23, aligning the cut-out portion 51' in the ring 47', the holes 73 and 75 in the pressure vessel housing 17, and the groove 71 in the second end cap 69 together, and inserting the yoke 31' through holes 73 and 75 in the pressure vessel 13 such that the bridge 37' of yoke 31' is flush with the second ring 47', fitting snugly in the cut-out portion 51', pin 33' extends through holes 73, the end portion 51' of pin 33' sits in the indent 53', pin 35' extends through holes 75, and the end portion 59' of pin 35' sits in the indent 55', as shown in FIG. 8.

In this ready-to-use position, the end portion 179 of the cartridge 15 is received on the anti-sway stub 177 to prevent the cartridge 15 from swaying back and forth inside the pressure vessel 13.

Fluid, such as water, may be passed through the hose 97 and the inlet channel 81 into the pressure vessel 13, through the purification material 125 where the fluid is filtered and purified, and through the outlet port 127 of the cartridge 15 and the outlet channel 101 in the first end cap 27 of pressure vessel 13 and into hose 117 which leads to an outlet port, such as a shower head 181.

When it is desired to replace cartridge 15 secured in the pressure vessel 13, the pressure vessel 13 may be opened by removing the yoke 31' from the pressure vessel 13, and using handle 163, pulling the second end cap 31' from the opening 23, so that the spent cartridge 15 may be pulled from the inside of the pressure vessel 13 and discarded. A replacement cartridge 15 then may be inserted into the pressure vessel 13 as detailed above.

Turning now to FIGS. 11–14, there is shown a purifier 183, which is an alternative embodiment of the invention. Purifier 183 is substantially the same as purifier 11, except that purifier 183 has a fluid flow-path diverter or by-pass means 185 located in its first end cap 187 for causing the fluid passing through the purifier 183 to by-pass the cartridge 15 as the fluid passes through the purifier 183, when filtered/purified fluid is not desired, such as when the purifier 183 is connected to bath tub/shower fittings when being used as a water purifier and the fluid is water being used to clean the bath tub.

Figure 14:
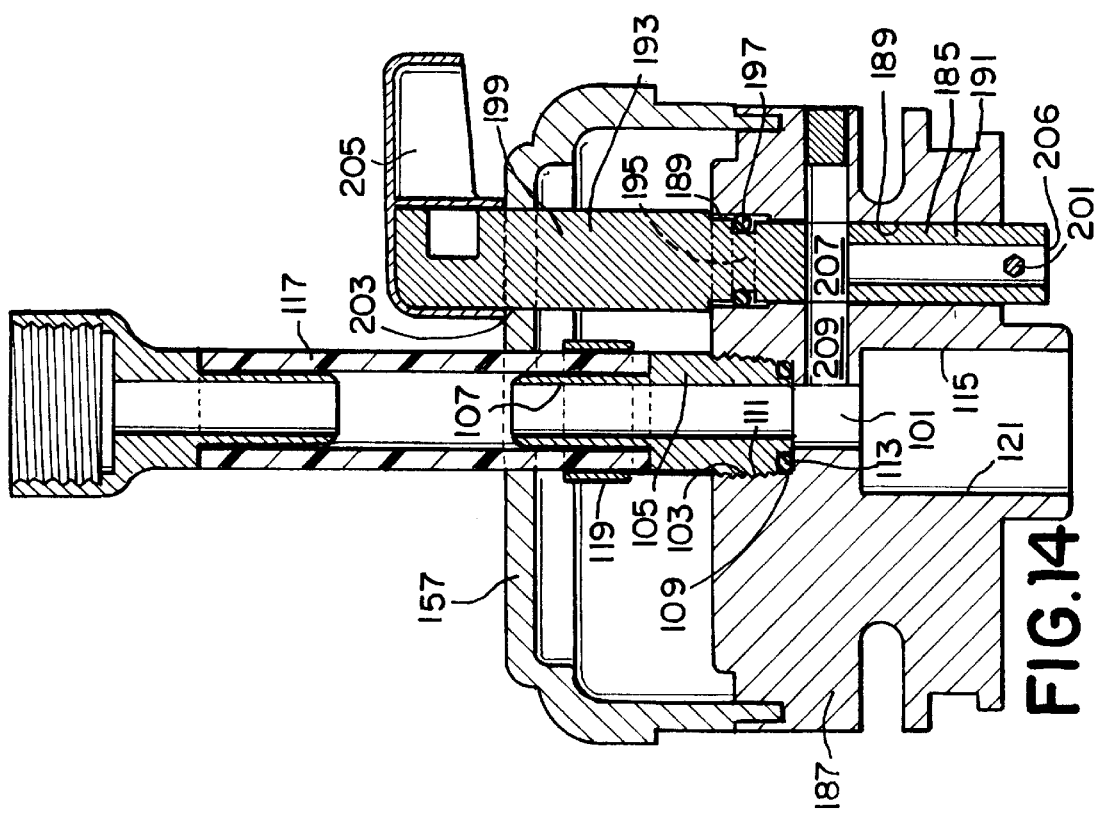
FIG. 14 is a view in cross section of the first end cap of the purifier shown in FIG. 11, showing by-pass means in a open position.
Figure 13:
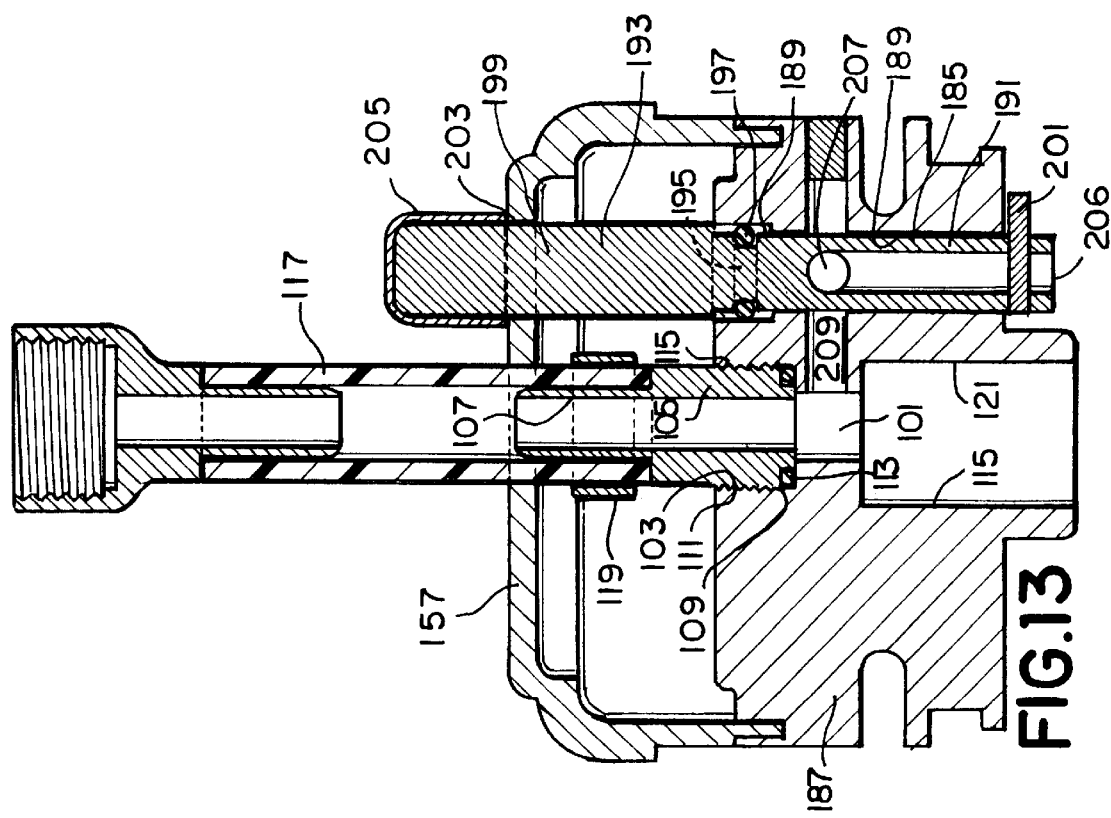
FIG. 13 is a view in cross section of the first end cap of the purifier shown in FIG. 11, showing by-pass means in a closed position.
Figure 15:
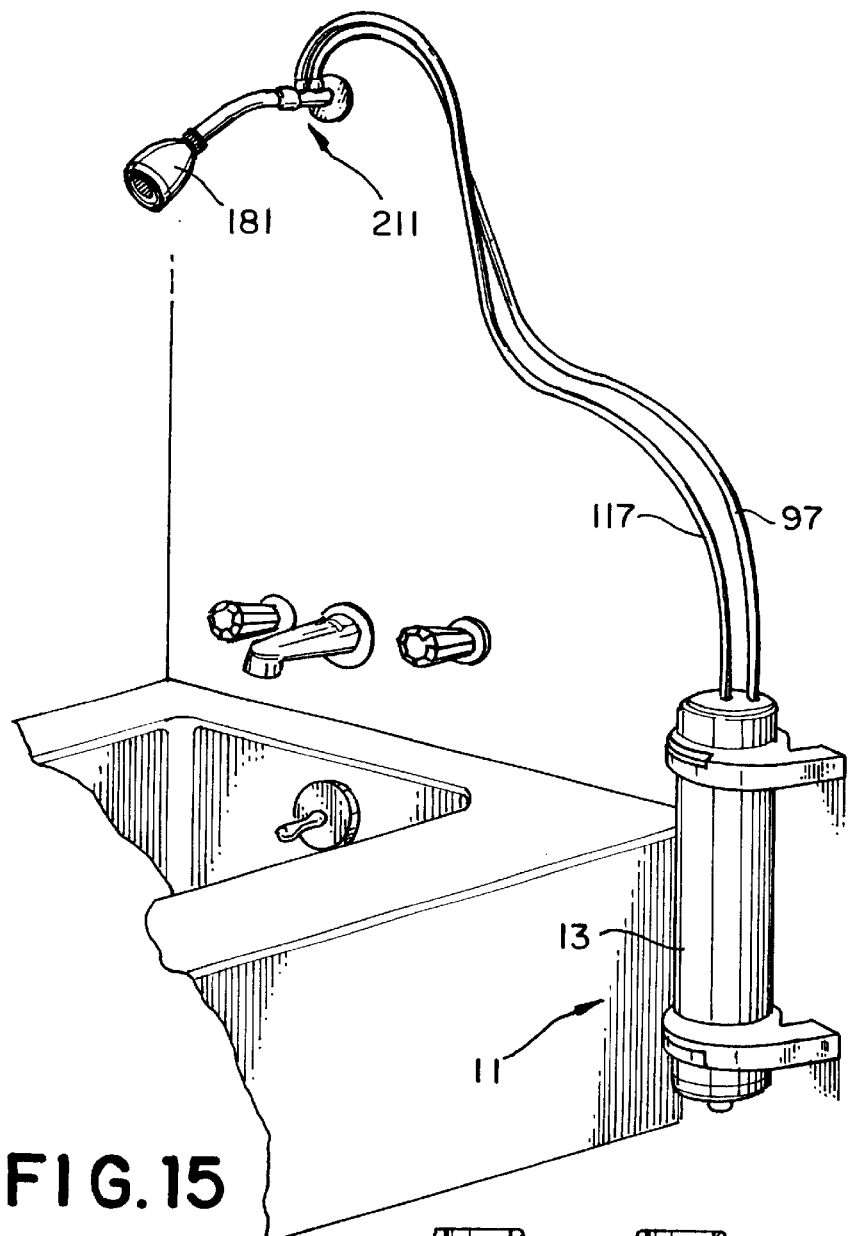
FIG. 15 shows the purifier shown in FIG. 3 mounted on a bathroom wall and connected to a shower adapter, constructed in accordance with the invention, which is mounted on and connected in series between the pipes feeding a shower head.
Figure 18:
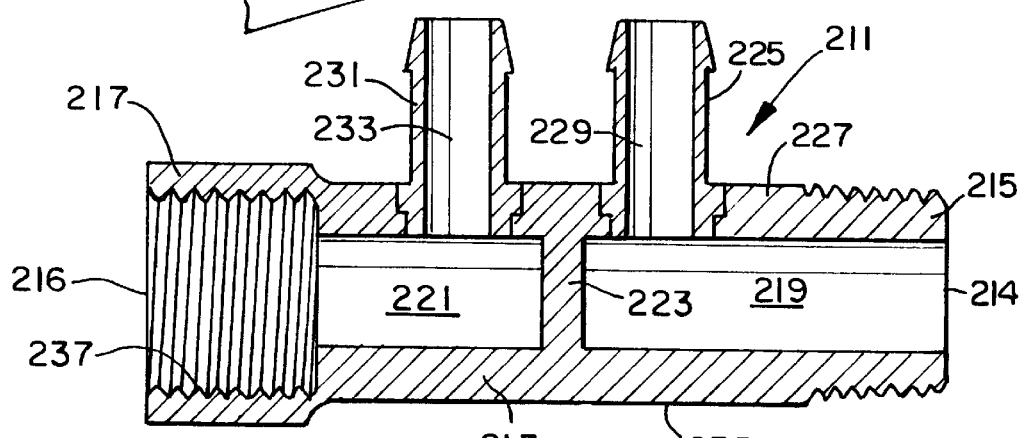
FIG. 18 is a view in cross section of the shower adapter shown in FIG. 17.

As shown in FIGS. 13 and 14, the first end cap 187, which, except for the inclusion of by-pass means 185, is substantially the same as first end cap 27 of purifier 11, has a circular bore 189 extending through it. The first end portion 191 of a rotatable circular shaft 193 is mounted in and extends through the bore 189. The first end portion 191 of shaft 193 is sized to fit snugly in the bore 189, but still be rotatable in the bore 189. A groove 195 is formed in and extends around the outer surface of the first end portion 191 of the shaft 193, and an O-ring gasket 197 is received in the groove 195 for sealing between the shaft 193 and the first end cap 187.

The second end portion 199 of the shaft 193 has a diameter greater than that of the bore 189.

Shaft 193 is secured in place in bore 189 by a pin 201 extending through the shaft 193 in a portion of the first end portion 191 of the shaft 193 that extends from the bore 189. The pin 201 blocks the withdrawal of the shaft 193 from the bore 189.

The second end portion 199 of the shaft 193 extends through a hole 203 in the beauty cap 157 and has a handle 205 mounted on it outside of the beauty cap 157 to facilitate the turning the shaft 193.

The first end portion 191 of the shaft 193 is hollow forming a passageway from the bottom 206 of the shaft 193 to a bore 207 formed in and extending through the first end portion 191 of the shaft 193.

The shaft 193 may be rotated until the bore 207 in the shaft 193 is aligned with a by-pass channel 209 formed in the first end cap 187 to connect the bore 207 to the outlet channel 101. When it is desired to have fluid passing through the purifier 183 by-pass the cartridge 15, the shaft 193 using handle 205 is rotated to align the bore 207 with the by-pass channel 209, which causes the fluid entering the purifier 183 through the inlet channel 81 to flow through the passageway formed by the hollow portion of the shaft 193 to the bore 207 in the shaft 193, through the bore 207 in the shaft 193 into the by-pass channel 209 in the end cap 187, through the by-pass channel 209 into the outlet channel 101 in the end cap 187, and through the outlet channel 101 in the end cap 187 into and through the hose 117 to the outlet port, such as a shower head 181. This by-pass route, when open, is the path of lesser resistance for the fluid flow, when compared to fluid flow through the cartridge 15.

When it is desired to close the by-pass means 185 and open the filtering/purifying route again, the shaft 193 is rotated to the position shown in FIG. 13, where the bore 207 in the shaft 193 is no longer in alignment with the by-pass channel 209.

Turning now to FIG. 15 to 18, there is shown a shower adapter 211, which is mounted in series on the plumbing fixtures leading to the shower head 181. Shower adapter 211 conveniently adapts the plumbing fixtures to feed water to be filtered/purified to the purifier 11, 183 and to feed filtered/purified water from the purifier 11, 183 to the shower head 181 by providing fittings so that the purifier 11, 183 may be easily connected to the plumbing fixtures. Shower adapter 211 comprises a substantially hollow pipe 213 having a water inlet port 214 at the first end portion 215 of the pipe 213, a water outlet port 216 at the second end portion 217 of the pipe 213, a first chamber 219, and a second chamber 221. The first chamber 219 and the second chamber 221 are separated from each other by a common wall, partition wall 223, which prevents the flow of water directly through pipe 213. First chamber 219 comprises the hollow space inside pipe 213 from the first end portion 215 of the pipe 213 to the partition wall 223, and the second chamber 221 comprises the hollow space inside pipe 213 from the second end portion 217 of the pipe 213 to the partition wall 223.

A barb 225 is mounted in an opening in the pipe wall 227, creating a water outlet passageway 229 from the first chamber 219 of the pipe 213.

A barb 231 is mounted in an opening in the pipe wall 227, creating a water inlet passageway 233 into the second chamber 221 of the pipe 213.

The first end portion 215 of pipe 213 at port 214 is provided with threading formed on the outside surface 235 of the pipe wall 227 for connecting the shower adapter 211 to the plumbing fixtures from the water feed line.

The second end portion 217 of the pipe 213 at port 216 is provided with threading formed on the inside surface 237 of the pipe wall 227 for connecting the shower adapter 211 to the plumbing fixtures leading to the shower head 181.

Hose 97 is attached to the barb 225, and hose 117 is attached to the barb 231.

In use, water from the shower water feed line enters the first chamber 219 of the pipe 213 through port 214, and then passes through passageway 229 into the hose 97 and into the purifier 11, 183 for treatment. Filtered/purified water leaves the purifier 11, 183 through hose 117 and enters into chamber 221 of the pipe 213 through passageway 233. The filtered/purified water exits chamber 221 through port 216, and then moves to the shower head 181.

ADVANTAGES

Advantages of the purifier of the invention include an easy and effective way to close the pressure vessel in a strong and secure manner.

The pressure vessel of the inventive purifier is easier to open and close than pressure vessels of conventional filtering devices having closure devices based on V-clamps, brackets, threads, or nuts and bolts. Ease in opening and closing the pressure vessel of a purifying device is especially important for people suffering from arthritis and the like, who may be using a purifying device to purify the water used in their water emersion therapy.

Further, the purifier of the invention may be opened and closed in seconds.

Unlike some conventional filtering devices whose hoses tend to twist together during use, the hoses of the inventive purifier tend to remain twist-free during use because the end cap 27 on which they are mounted is free to rotate when attached to the pressure vessel housing 17.

The cartridge 15 does not require threading to be secured in place in the pressure vessel housing 17. The cartridge 15 is easily mounted in the pressure vessel 13 by simply sliding the cartridge 15 into the pressure vessel 13. The cartridge is self-aligning during installation due to the conical cap 157 acting as a ramp to properly align the stem 129 of the cartridge 15 when the conical cap 137 hits against the entrance of the second socket 121 in the outlet channel 101 of the first end cap 27. The cartridge 15, when spent, is easily removed from the pressure vessel 13 by merely pulling it from inside the pressure vessel housing 17.

The purifier of the invention has a low center of gravity which provides stability against overturning. The purifier of the invention has self-leveling feet, and optionally it may be easily mounted on a surface such as a bathroom wall or bathroom floor.

The purifier of the invention has an optional by-pass means 185 for by-passing the cartridge 15 as fluid passes through the purifier, when filtrated/purified fluid is not desired. For instance, when the purifier of the invention is connected to bathtub fixtures, the optional by-pass means 183 may be used to by-pass the cartridge 15 as the water passes through the purifier, when filtered/purified water is not desired, such as when the water is being used to clean a bathtub. This by-pass feature extends the life of the cartridge 15 since fluid, such as water, may be directed to by-pass the cartridge 15 when filtered/purified fluid is not required. Also, the by-pass means 185 of the inventive purifier saves time and energy since, rather than disconnecting the purifier from the fluid lines (e.g., the plumbing fixtures), the by-pass means 185 may be used when filtered/purified fluid is not required. This is an advantage of the inventive purifier over filtering devices which require disconnecting the filtering device from the fluid lines (e.g., the plumbing lines) if it is desired not to treat the fluid (e.g., water) from the fluid lines (e.g., the plumbing fixtures), saving much time and energy.

The flow rate of fluid from the fluid source is virtually undiminished when flowing through the inventive purifier, except when the purifying element is saturated with contaminants and chemicals, and a reduction in flow rate indicates that the purifier is saturated and is due to be replaced with a fresh purifying element.

The purifier of the invention removes unwanted chemicals and contaminants from fluid. For instance, if the purifier 11, 183 is being used as a water purifier, the purifier 11, 183 removes unwanted chemicals and contaminants such as chlorine, chloroform, and other chemicals and THMs typically found in bath/shower water. The purifier 11, 183 also removes water-born pathogens, such as giardia and cryptosporidium, from water.

What is claimed is:

1. An apparatus for housing a purifying element for filtering and purifying a fluid, comprising a pressure vessel for holding a purifying element for filtering and purifying the fluid, the pressure vessel having inlet and outlet means for introducing the fluid into the pressure vessel and for removing the fluid from the pressure vessel, the pressure vessel having a housing having a first opening formed therein, the pressure vessel having an outer surface portion, the pressure vessel having a first end cap for closing the first opening in the housing of the pressure vessel, sealing means located between the first end cap and the housing of the pressure vessel for sealing between the first end cap and the housing, securing means for securing the first end cap to the housing when desired, the second means including a first yoke extending between the housing and the first end cap, the first end cap being substantially cylindrical in shape and having a groove extending around its circumference in its side portion for receiving the first yoke, the housing being provided with a first pair of holes that are aligned with the groove in the first end cap, wherein the first yoke secures the first end cap to the housing by extending through the first pair of holes in the housing and tangentially across the side portion of the first end cap in a portion of the groove, and level compensating support means for supporting the pressure vessel above a surface on which the apparatus rests in a secure, non-wobbling manner, the level compensating support means comprising a first ring surrounding a portion of the outer surface portion of the pressure vessel and in sliding contact with the outer surface portion of the pressure vessel, a first pair of feet extending from the first ring for supporting the pressure vessel, a second ring surrounding a portion of the outer surface portion of the pressure vessel, and a second pair of feet extending from the second ring for supporting the pressure vessel, wherein the first ring may be rotated around the outer surface portion of the pressure vessel as needed to position the feet of the first ring such that all of the feet are in contact with the surface on which the apparatus rests, the housing being provided with a second pair of holes that are aligned with the groove in the first end cap, the first yoke having a substantially inverted U-shape, the first yoke comprising a first pin having an end portion, a second pin having an end portion, and a bridge having a first end portion and a second end portion, the first pin being mounted on the first end portion of the bridge and extending therefrom, and the second pin being mounted on the second end portion of the bridge and extending therefrom parallel to the first pin, wherein the first yoke secures the first end cap to the housing by the first pin extending trough the first pair of holes in the housing and tangentially across the side portion of the first end cap in a portion of the groove and the second pin extending through the second pair of holes in the housing and tangentially across the side portion of the first end cap, the holes in the first pair of holes and in the second pair of holes being in the form of slots, and the first ring having a cut-out portion shaped to snugly receive the bridge of the first yoke and having two recesses on its inside surface to receive the end portion of the first and second pins of the first yoke when the first yoke is securing the first end cap to the housing.

2. The apparatus of claim 1, further including a second opening formed in the housing, a second end cap for closing the second opening in the housing, sealing means located between the second end cap and the housing of the pressure vessel for sealing between the second end cap and the housing, and securing means for securing the second end cap to the housing when desired, the securing means including a second yoke extending between the housing and the second end cap, the second end cap being substantially cylindrical in shape and having a groove extending around its circumference in its side portion for receiving the second yoke, the housing being provided with a second pair of holes that are aligned with the groove in the second end cap, wherein the second yoke secures the second end cap to the housing by extending through the second pair of holes in the housing and tangentially across the bide portion of the second end cap in a portion of the groove.

3. The apparatus of claim 2, the housing being provided with a third pair of holes that are aligned with the groove in the second end cap, and the second yoke having a substantially inverted U-shape, the second yoke comprising:

a first pin having an end portion, a second pin having an end portion, and a bridge having a first end portion and a second end portion, the first pin being mounted on the first end portion of the bridge and extending therefrom, and the second pin being mounted on the second end portion of the bridge and extending therefrom parallel to the first pin, wherein the second yoke secures the second end cap to the housing by the first pin of the second yoke extending through the second pair of holes in the housing and tangentially across the side portion of the second end cap in a portion of the groove in the second end cap and the second pin of the second yoke extending through the third pair of holes in the housing and tangentially across the side portion of the second end cap in a portion of the groove in the second end cap.

4. The apparatus of claim 1, further including mounting moans located in the feet for mounting the apparats to a surface.

5. The apparatus of claim 1, the fluid being water to be used in a bath or shower.

6. The apparatus of claim 1, including means for facilitating the removal of the yoke from the first ring and housing to enable removal of the first end cap from the opening in the pressure vessel comprising a recess formed in the bridge that is adapted to receive any type of prying tool for prying the bridge out.

7. An apparatus for housing a purifying element for filtering and purifying a fluid, comprising a pressure vessel for holding a purifying element for filtering and purifying the fluid, the pressure vessel having inlet and outlet means for introducing the fluid into the pressure vessel and for removing the fluid from the pressure vessel, the pressure vessel having a housing having a first opening formed therein, the pressure vessel having an outer surface portion, the pressure vessel having a first end cap for closing the first opening in the housing of the pressure vessel, sealing means located between the first end cap and the housing of the pressure vessel for sealing between the first end cap and the housing, securing means for securing the first end cap to the housing when desired, the securing means including a first yoke extending between the housing and the first end cap, the fist end cap being substantially cylindrical in shape and having a groove extending around its circumference in its side portion for receiving the first yoke, the housing being provided with a first pair of holes that are aligned with the groove in the first end cap, wherein the first yoke secures the first end cap to the housing by extending trough the first pair of holes in the housing and tangentially across the side portion of the first end cap in a portion of the groove, level compensating support means for supporting the pressure vessel above a surface on which the apparatus rests in a secure, non-wobbling manner, the level compensating support means comprising a first ring surrounding a portion of the outer surface portion of the pressure vessel and in sliding contact with the outer surface portion of the pressure vessel, a first pair of feet extending from the first ring for supporting the pressure vessel, a second ring surrounding a portion of the outer surface portion of the pressure vessel, and a second pair of feet extending from the second ring for supporting the pressure vessel, wherein the first ring may be rotated around the outer surface portion of the pressure vessel as needed to position the feet of the first ring such that all of the feet are in contact with the surface on which the apparatus rests, a second opening formed in the housing, a second end cap for closing the second opening in the housing, sealing means located between the second end cap and the housing of the pressure vessel for sealing between the second end cap and the housing, and securing means for securing the second end cap to the housing when desired, the securing means including a second yoke extending between the housing and the second end cap, the second end cap being substantially cylindrical in shape and having a groove extending around its circumference in its side portion for receiving the second yoke, the housing being provided with a second pair of holes that are aligned with the groove in the second end cap, wherein the second yoke secures the second end cap to the housing by extending through the second pair of holes in the housing and tangentially across the side portion of the second end cap in a portion of the groove, the housing being provided with a third pair of holes that are aligned with the groove in the second end cap, the second yoke having a substantially inverted U-shape, the second yoke comprising a first pin having an end portion, a second pin having an end portion, and a bridge having a first end portion and a second end portion, the first pin being mounted on the first end portion of the bridge and extending therefrom, and the second pin being mounted on the second end portion of the bridge and extending therefrom parallel to the first pin, wherein the second yoke secures the second end cap to the housing by the first pin of the second yoke extending through the second pair of holes in the housing and tangentially across the side portion of the second end cap in a portion of the groove in the second end cap and the second pin of the second yoke extending through the third pair of holes in the housing and tangentially across the side portion of the second end cap in a portion of the groove in the second end cap, the holes in the second pair of holes and in the third pair of holes being in the form of slots, and the second ring having a cut-out portion shape to snugly receive the bridge of the second yoke and having two recesses on its inside surface to receive the end portions of the first and second pins of the second yokes when the second yoke is securing the second end cap to the housing.

8. The apparatus of claim 7, further including by-pass means for causing the fluid to by-pass the purifying element as the fluid passes through the pressure vessel, when filtering and purified fluid are not desired.

9. The apparatus of claim 8, the by-pass means comprising a by-pass channel formed in the first end cap and extending from the interior of the pressure vessel to the outlet means downstream from the purifying element, and valve means for opening and closing the by-pass channel as desired.

10. The apparatus of claim 7, the inlet and outlet means being formed in the first end cap.

11. An apparatus for housing a purifying element for filtering and purifying a fluid, comprising a pressure vessel for housing a purifying element holding a purifying element for filtering and purifying the fluid, the pressure vessel having inlet and outlet means for introducing the fluid into the pressure vessel and for removing the fluid from the pressure vessel, the pressure vessel having a housing having a first opening and a second opening formed therein, the pressure vessel having an outer surface portion, the pressure vessel having a first end cap for closing the first opening in the housing of the pressure vessel, sealing means located between the first end cap and the housing of the pressure vessel for sealing between the first end cap and the housing, securing means for securing the first end cap to the housing when desired, the securing means including a first yoke extending between the housing and the first end cap, the first end cap being substantially cylindrical in shape and having a groove extending around its circumference in its side portion for receiving the first yoke, the housing being provided with a first pair of slots and a second pair of slots that are aligned with the groove in the first end cap, the first yoke having a substantially inverted U-shape, the first yoke comprising a first pin having an end portion, a second pin having an end portion, and a bridge having a first end portion and a second end portion, the first pin being mounted on the first end portion of the bridge and extending therefrom, and the second pin being mounted on the second end portion of the bridge and extending therefrom parallel to the first pin, wherein the first yoke secures the end cap to the housing by the first pin of the first yoke extending through the first pair of slots in the housing and tangentially across the side portion of the end cap in a portion of the groove of the first end cap and the second pin of the first yoke extending through the second pair of slots in the housing and tangentially across the side portion of the end cap in a portion of the groove in the first end cap, a second end cap for closing the second opening in the housing, sealing means located between the second end cap and the housing of the pressure vessel for sealing between the second end cap and the housing, securing means for securing the second end cap to the housing when desired, the securing means including a second yoke extending between the housing and the second end cap, the second end cap being substantially cylindrical in shape and having a groove extending around its circumference in its side portion for receiving the second yoke, the housing being provided with a third pair of holes and a fourth pair of holes that are aligned with the groove in the second end cap, the second yoke having a substantially inverted U-shape, the second yoke comprising a first pin having an end portion, a second pin having an end portion, and a bridge having a first end portion and a second end portion, the first pin being mounted on the first end portion of the bridge and extending therefrom, and the second pin being mounted on the second end portion of the bridge and extending therefrom parallel to the first pin, wherein the second yoke secures the second end cap to the housing by the first pin of the second yoke extending through the third pair of holes in the housing and tangentially across the side portion of the second end cap in a portion of the groove id the second end cap and the second pin of the second yoke extending through the fourth pair of holes in the housing and tangentially across the side portion of the second end cap, and level compensating support means for supporting the pressure vessel above a surface on which the apparatus rests in a secure, non-wobbling manner, the level compensating support means comprising a first ring surrounding a portion of the outer surface portion of the pressure vessel and in sliding contact with the outer surface portion of the pressure vessel, a fist pair of feet extending from the first ring for supporting the pressure vessel, a second ring surrounding a portion of the outer surface portion of the pressure vessel, and a second pair of feet extending from the second ring for supporting the pressure vessel, wherein the first ring may be rotated around the outer surface portion of the pressure vessel as needed to position the feet of the first ring such that all of the feet are in contact with the surface on which the apparatus rests, the first ring having a cut-out portion shaped to snugly receive the bridge of the first yoke and having two recesses on its inside surface to receive the end portions of the first and second pins of the first yoke when the first yoke is securing the first end cap to the housing, and the second ring having a cut-out portion shape to snugly receive the bridge of the second yoke and having two recesses on its inside surface to receive the end portions of the first and second pins of the second yoke when the second yoke is securing the second end cap to the housing.

12. The apparatus of claim 11, the second ring being in sliding contact with the outer surface of the pressure vessel, the holes of the third pair of holes and the fourth pair of holes being in the form of slots, wherein the first and second rings may be rotated around the outer surface portion of the pressure vessel as needed to position the feet such that all of the feet are in contact with the surface on which the apparatus rests.

13. The apparatus of claim 11, further including by-pass means formed in tee first end cap for causing the fluid to by-pass the purifying element as the fluid passes through the pressure vessel, when filtered/purified fluid is not desired.

14. The apparatus of claim 13, the by-pass means comprising a by-pass channel formed in the first end cap and extending from the interior of the pressure vessel to the outlet means downstream from the purifying element, and valve means for opening and closing the by-pass channel as desired.

15. The apparatus of claim 11, the inlet and outlet means being formed in the first end cap.

16. The apparatus of claim 11, further including mounting means located in the feet for mounting the apparatus to a surface.

17. A purifier for filtering and purifying a fluid, comprising a pressure vessel for holding a purifying element for filtering and purifying the fluid, the pressure vessel having inlet and outlet means for introducing the fluid into the pressure vessel and for removing the fluid from the pressure vessel, the pressure vessel having a housing having an opening formed therein, the pressure vessel having an end cap for closing the opening in the housing of the pressure vessel, sealing means located between the end cap and the housing of the pressure vessel for sealing between the end cap and the housing, and securing means for securing the end cap to the housing when desired, the securing means including a yoke extending between the housing and the end cap, and further including a cartridge positioned in the pressure vessel and having purification material through which fluid is passed which exits the cartridge through an outlet port having an annular stem, said cartridge having self-aligning means including a conical cap having holes therein through which the filtered/purified water is passed, said cartridge being self-aligning during installation since when the cartridge is slid into the pressure vessel, a portion of the conical cap hits against an entrance of a socket in an outlet channel in the end cap which acts as a ramp to properly align the stem of the cartridge for insertion into the end cap.

18. The purifier of claim 17, including a handle mounted on the end cap extending from the opening in the housing when it is desired to replace the cartridge, said end cap having an anti-sway stub which is adapted to fit into an opening in the end of the cartridge to prevent the cartridge from swaying in the pressure vessel during use of the purifier.

\* \* \* \* \*